United States Patent

[11] 3,588,063

| [72] | Inventors | Peter A. Angevine<br>South Salem, N.Y.;<br>Robert J. Priestley, Westport, Conn. |
|---|---|---|
| [21] | Appl. No. | 821,725 |
| [22] | Filed | May 5, 1969 |
| [45] | Patented | June 28, 1971 |
| [73] | Assignee | Dorr-Oliver, Incorporated<br>Stamford, Conn. |

[54] PROCESS FOR COMPACTING DECREPITATABLE FINES
13 Claims, 1 Drawing Fig.

| [52] | U.S. Cl. | 263/53 |
|---|---|---|
| [51] | Int. Cl. | C04b 1/02 |
| [50] | Field of Search | 263/53;<br>106/73 |

[56] References Cited
UNITED STATES PATENTS
3,402,225  9/1968  Cameron et al. ............... 263/53

*Primary Examiner*—John J. Camby
*Attorneys*—D. M. Mezzapelle, J. Dennis Malone, William J. Fox and Theodore M. Jablon

ABSTRACT: Recovery and compacting process for treating fines resulting from the decrepitation of feed solids to produce a granular substantially dust-free product which resists decrepitation upon being subjected to heat treatment. The process finds particular application in compacting decrepitated limestone fines coming from the preheat compartment of a fluidized bed limestone calcination system.

PATENTED JUN 28 1971
3,588,063
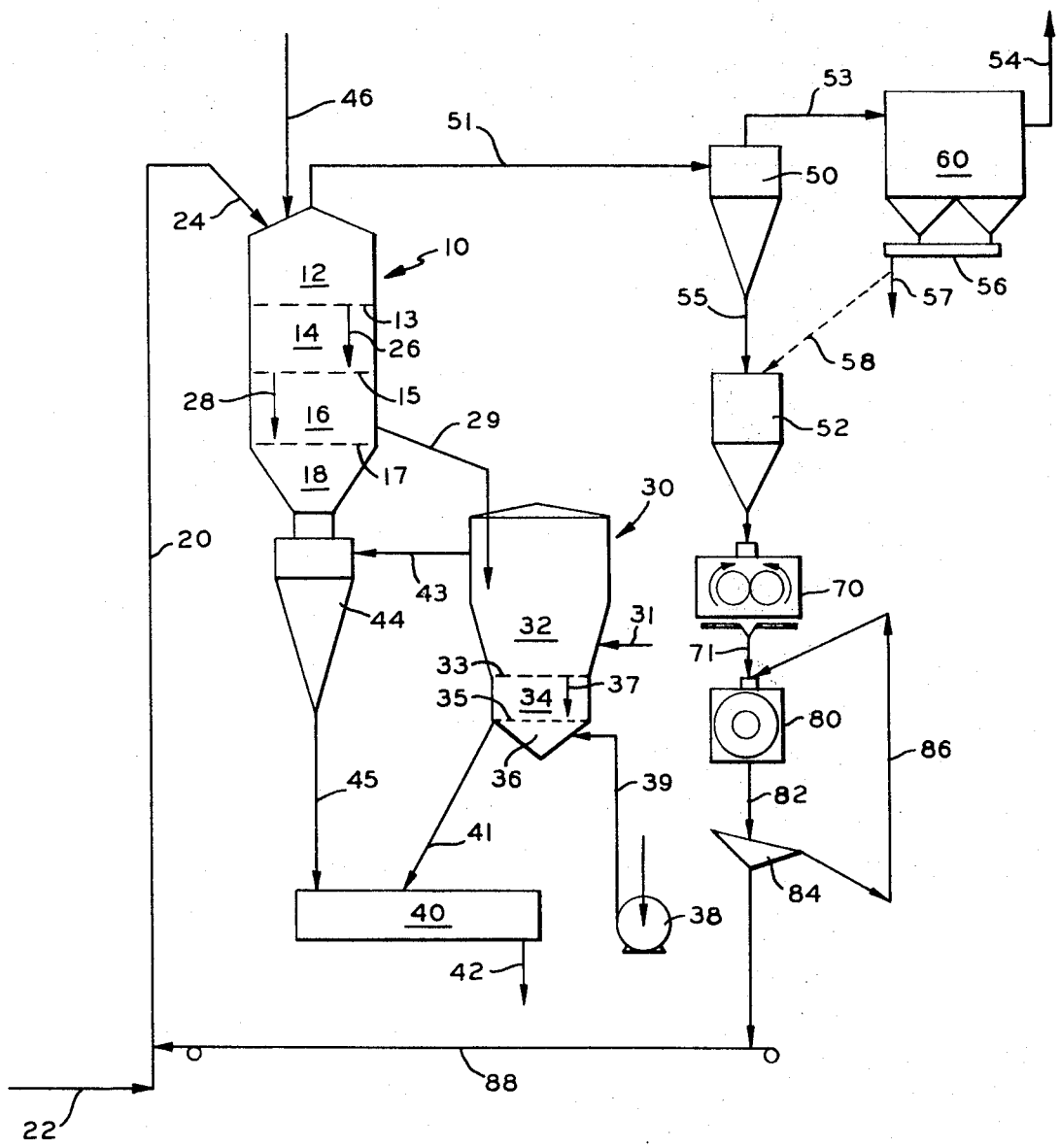
PETER A. ANGEVINE
ROBERT J. PRIESTLEY
INVENTORS.
BY D. M. Messapelle
ATTORNEY.

3,588,063

PROCESS FOR COMPACTING DECREPITATABLE FINES

It is well known to calcine lime forming material, such, for example, limestone, in a fluidized bed reactor whereby carbon dioxide is driven off and the limestone is converted to calcium oxide or burnt lime.

In the conventional process for producing lime, the raw material, generally mined limestone, is ground to a proper size and then subjected to heat treatment in a multistage fluidized bed reactor comprising at least one preheat stage and a calcination stage. In the past, considerable difficulty was experienced with this process due to excessive dust carryover. This dust is of two types, (1) limestone dust ($CaCO_3$) formed when the limestone is ground prior to introduction into the reactor and (2) calcined lime dust (CaO) which is produced by the decrepitation of the calcined lime within the calcination compartment of the reactor.

As used herein, the term decrepitation refers to the disintegration or breakdown of the solid particles into finer particles as they are processed.

It has been suggested and processes have been proposed to separately recover this dust since both types of dust are salable products; the limestone ($CaCO_3$) fines find extensive use as an agricultural product while the lime (CaO) is usable as a reactant. However, the commercial value of these products is dependent upon their purity, that is, limestone is of little value unless it is substantially free of calcined lime while the calcined lime is of little value unless it is substantially free of limestone.

Accordingly, the proposed processes involved special operating and recovery steps such for example preclassification of the ground ore in order that the limestone dust and lime dust be separately recovered.

However, these additional process steps impose a severe economic limitation on the commercial value of these processes because of the added equipment and operating costs and, therefore, where permitted, these fines are wasted to atmosphere, or the fine laden gases scrubbed with water and the resulting effluent discarded.

Recent attempts to calcine certain limestones in a multistage fluidized bed reactor in accordance with these prior art processes has proven unsuccessful primarily because the amount of dust generated in the reactor was appreciably higher than that anticipated. It was found that this excessive dust carryover was due to unexpected thermal decrepitation of the limestone in the preheat compartment of the reactor contrary to previous experience that decrepitation occurred only in the calcination compartment. This predecrepitation of the limestone in the preheat compartment resulted in excessive feed requirements, in order to meet designed capacity, and compounded the dust disposal problem.

To minimize these disposal losses, the dust was recycled to the calcination compartment. However, this had the disadvantage that it upset the heat balance since additional fuel and air was needed to raise the temperature of the limestone dust to calcination temperatures. Furthermore, it was found that a circulating load of both calcined and uncalcined limestone dust was established between the preheat and calcining compartments. As the escaped calcined dust passed up to the preheat compartment, most of it recarbonated, due to the presence of high $CO_2$ concentration at reduced temperatures, or hydrated, due to water sprays in the preheat compartment for temperature control, thereby increasing the tendency of the tuyeres in said preheat compartment to plug thus decreasing the capacity of the calcine.

Accordingly, the principal object of this invention is to provide a process for treating fines resulting from the decrepitation of solids such as when treated in a fluidized bed which avoids the disadvantages of the prior art processes.

The invention is predicated on the discovery that limestone dust may be compacted or briquetted at temperatures above 400° F. without the use of binders other than calcined lime which is a product of the calcination operation to form a product which may be ground to a size consistency suitable for calcination treatment in a fluidized bed reactor and which upon being subjected to thermal shock such as in the preheat compartment of a fluidized bed reactor, resists decrepitation. Moreover, quite unexpectedly, it was found that when the thus briquetted limestone was subjected to calcination treatment the amount of decrepitation which occurred was materially reduced.

Thus, the invention provides a practical solution for the utilization of said excess limestone dust as well as producing a product which is extremely suitable as calciner feed since it does not decrepitate to the extent therefore experienced.

Furthermore, the invention provides a process for economically recovering and utilizing fines which heretofore were wasted thus obviating the pollution of the surrounding atmosphere.

In order that it may be clearly understood and readily carried into effect the invention will now be described by way of example with reference to the accompanying drawings which is a diagrammatic representation on the flowsheet of this invention.

Referring now to the drawing, the apparatus for carrying out the process of this invention comprises a multicompartment fluidized bed reactor, here shown as consisting of two reactor shells 10 and 30; a dust recovery system consisting of a cold cyclone 50 and a baghouse 60; and a compacting granulation system, including a compacting or briquetting press 70 and granulator 80.

Specifically, reactor shell 10 contains a plurality of preheat compartments 12, 14 and 16, each containing a bed of solids to be treated supported by constriction plates 13, 15 and 17, respectively; reactor shell 10 is also provided with an intercompartment wind box 18. Reactor shell 30 encompasses a calcination compartment 32, a cooling compartment 34 and a wind box 36 separated by constriction plates 33 and 35, respectively, supporting a bed of treated solids.

Solids to be treated, in this case crushed and sized limestone, are supplied to the top preheat compartment 12 via a suitable elevator, designated by reference numeral 20, which receives solids from a feed bin, not shown, via line 22. The feed solids enter the top preheat compartment through 12, a feed conduit 24 equipped with a suitable control valve, not shown. The solids pass successively from preheat compartment 12 to preheat compartments 14 and 16 through transfer conduits 26 and 28 respectively, also provided with suitable valve means, not shown. The preheated solids in compartment 16 are transferred through transfer conduit 29 into the calcination compartment 32 in reactor shell 30. From the calcination compartment 32 the treated solids now in the form of burnt lime are delivered through transfer conduit 37 to a cooling compartment 34 which is supplied with fluidized air from blower 38 via line 39. The treated solids from compartment 34 are then transferred via line 41 to a product cooler 40 and the treated cooled products recover at line 42.

The combustion or fluidizing air is introduced by blower 38 into wind box 36 and then flows upwards through the cooling compartment 34, calcining compartment 32 and thereafter from the freeboard space of compartment 32 into the hot cyclone 44 via line 43. In hot cyclone 44 fine lime solids entrained in the spent fluidizing gases leaving calciner compartment 32 are separated and discharged via line 45 to cooler 40 where they are collected as product. The spent fluidizing gases now relatively free of lime solids passes out of the overflow of cyclone 44 and then successively through wind box 18 and preheat compartments 16, 14 and 12, thus fluidizing and preheating the downward moving incoming feed. From the top of preheat compartment 12 the spent gases are transferred via line 51 to cold cyclone 50 of the dust recovery system.

In the cold cyclone the fine limestone solids, entrained in the spent fluidizing gases leaving reactor shell 10 are separated and transferred via line 55 to a surge bin 52 which serves as a feed hopper for the briquetting press 70. However, since the cold cyclone 50 is not effective for separating the very fine solids, in the form of dust, the separated gases from cyclone 60 are transferred via line 53 to an air separator or baghouse 60 where substantially all the dust is separated before the gases are discharged to atmosphere such as via line 54. The solids separated in baghouse 60 are collected at 56 before being discharged at line 57 to product. Alternatively, a portion of these solids may be recirculated via line 58 to feed bin 52 to be mixed with the fines separated in cold cyclone 50.

The fines from bin 52 are fed to a briquetting press 70 and the resulting platelets or briquettes are transferred via line 71 to a granulator where the platelets are ground to a proper size for treatment in the fluidized bed.

As shown, the ground material from granulator 80 are initially screened on screen 82. The oversize particles from screen 84 are recycled via line 86 to granulator 80 while the undersize is combined with the incoming feed material via line 88 before being introduced into the preheat compartment of the fluidized bed.

In operation, limestone solids which have been ground to a size range of minus 6 mesh are introduced into the preheat compartment 12 where they are preheated to a temperature above 500° F., and preferably about 750° F. and then pass successively through compartments 14 and 16 maintained at temperatures of about 1,200° F. and 1,500° F. respectively by the hot rising exhaust gases from the calcination compartment 32. The preheated limestone solids are thereafter transferred to a calcination compartment 32 where they are calcined at a temperature of about 1,750° F. and then cooled in compartment 34 to a temperature of about 700° F. by direct heat exchange with relatively cool uprising fluidizing air introduced by blower 38.

Fluidizing air enters the reactor shell 30 at a temperature of about 140° F. and at a velocity sufficient to fluidize the bed of solids in the cooling compartment 34 and the calcination compartment 32.

The temperature of the calcination compartment 32 is maintained in the aforesaid range by combustion of a fuel, such as natural gas, introduced directly into the calcination compartment 32 through a fuel feed gun, indicated generally by reference numeral 31.

As indicated above, the spent hot fluidizing gases pass out the freeboard space of compartment 32 through the hot cyclone 44 and into wind box 18 of reactor shell 10. As the hot gases move upward, countercurrent to the downward moving solids, they preheat the solids in the preheat compartments 12, 14 and 16.

Before being discharged to cyclone 50, the temperature of the spent gases in preheat compartment 12 and containing entrained limestone solids is further reduced to about 500° F. by spraying water into the freeboard space of preheat compartment 12 such as through line 46.

In cyclone 50, fine limestone solids having a mesh size of about minus 65 (Tyler series) and a temperature of about 500° F. are separated and fed to briquetting press 70 as previously described. In press 70 the fines are compacted preferably at a pressure of about 3,000 p.s.i.g. to produce this rectangular-shaped platelet. These platelets are thereafter pulverized to a size of about minus 6 mesh in granulator 80 and screened on a minus 6-mesh screen.

The minus 6-mesh particles are now suitable as feed material for the fluidized bed reactor and are transferred via line 88 to preheat compartment 12 along with the incoming feed from line 22. The oversized particles are recycled to granulator 80.

The invention will be better understood from the following examples:

EXAMPLE I - PRIOR ART

Limestone, having the following chemical composition:

TABLE 1

| | |
|---|---|
| $CaCO_3$, percent | 97.0 |
| $MgCO_3$, percent | 0.8 |
| Inert material, percent | 2.2 | was ground to a particle size of 6×0 mesh and fed to a 4 inch test reactor which was operated under conditions simulating a commercial unit.

The following operating conditions existed in the preheat and calcination compartments.

TABLE 2

| | Temperature, ° F. | |
|---|---|---|
| | Bed | Freeboard |
| 1st preheat compartment | 750 | 550 |
| 2nd preheat compartment | 1,200 | 1,200 |
| 3rd preheat compartment | 1,500 | 1,500 |
| Calcination compartment | 1,750 | 1,800 |

The results of the operation were as follows:

TABLE 3.—PRODUCT DISTRIBUTION
(Feed Basis)

| | Percent |
|---|---|
| Total Feed | 100 |
| Burnt Lime Product | 50.1 |
| Carryover Product: | |
|    Cold Cyclone dust | 46.2 |
|    Baghouse dust | 3.7 |

This data indicates that only about 50 percent of the limestone feed will be recovered as burnt lime product, of the remaining 50 percent, approximately 19 percent is fine limestone present in the feed as −100 mesh, the remaining 31 percent is limestone which decrepitates in the preheat compartments.

EXAMPLE II - INVENTION

In accordance with the invention the cold cyclone product of example I was preheated to a temperature of about 500° F. and fed into a Komarck Greaves briquetting press model 75MS having a 20.5 inch diameter by 4.7 inch wide rolls. The rolls were operated at 6 r.p.m. with hydraulic pressure of 3,000 p.s.i.g. The feed screw was operated at a speed of 96 r.p.m. The resulting briquettes had a dimension of 4½×4½×½inch thickness. These briquettes were pulverized to −6 mesh in a Komarck Greaves granulator. The pulverized product was then screened on a 6×50 mesh vibrating screen.

The −6 mesh compacted dust product was recovered and fed to the first of three preheat compartments operated under conditions simulating the commercial unit.

Thereafter the preheated particles were fed to calcination compartment.

The feed to the second and third preheat compartment and calcination compartment was the formal underflow product from the preceding compartment.

The operating conditions maintained and the results obtained were as follows:

TABLE 4
[Operating Conditions in First Preheat Compartment]

Bed Temperature, 548° F.
Freeboard Temperature, 608° F.
Cyclone Temperature, 631° F.
Feed Rate, 338 gm./min.
Bed Depth, 24 inches.
Bed Detention Time, 19.5 min.
Exit Gas Analysis:
   $CO_2$, 0.0%.
   $O_2$, 21.0%.

SIZE DISTRIBUTION OF FEED AND PRODUCTS

| | Percent cumulative plus | |
|---|---|---|
| | Feed | Composite product |
| Mesh: | | |
| 8 | 27.6 | 27.4 |
| 10 | 48.8 | 49.5 |
| 14 | 62.8 | 62.6 |
| 20 | 72.5 | 70.6 |
| 28 | 79.8 | 76.4 |
| 35 | 85.0 | 80.2 |
| 48 | 89.3 | 82.9 |
| 65 | 94.2 | 86.6 |
| 100 | 97.5 | 89.9 |
| 150 | 98.2 | 92.0 |
| 200 | 98.5 | 93.6 |

TABLE 5

[Operating Conditions in 2nd Preheat Compartment]

Bed Temperature, 1,195° F.
Freeboard Temperature, 1,224° F.
Cyclone Temperature, 1,224° F.
Feed Rate, 350 gm./min.
Bed Depth, 24 inches
Bed Detention Time, 16 min.
Exit Gas Analysis:
  $CO_2$, 0.0%
  $O_2$, 21.0%

SIZE DISTRIBUTION OF FEED AND PRODUCTS

|  | Percent cumulative plus | |
|---|---|---|
|  | Feed | Composite product |
| Mesh: | | |
| 8 | 30.8 | 31.2 |
| 10 | 55.7 | 54.5 |
| 14 | 70.4 | 68.2 |
| 20 | 79.6 | 77.3 |
| 28 | 86.0 | 83.2 |
| 35 | 90.2 | 86.9 |
| 48 | 93.3 | 89.7 |
| 65 | 96.7 | 92.6 |
| 100 | 98.1 | 94.4 |
| 150 | 98.5 | 95.3 |
| 200 | 98.9 | 96.2 |

TABLE 6

[Operating Conditions in 3rd Preheat Compartment]

Bed Temperature, 1,512° F.
Freeboard Temperature, 1,528° F.
Cyclone Temperature, 1,530° F.
Feed Rate, 350 gm./min.
Bed Depth, 24 inches.
Bed Detention Time, 17.5 min.
Exit Gas Analysis:
  $CO_2$, 22.7%.
  $O_2$, 1.8%.

SIZE DISTRIBUTION OF FEED AND PRODUCTS

|  | Percent cumulative plus | |
|---|---|---|
|  | Feed | Composite product |
| Mesh: | | |
| 8 | 33.9 | 30.8 |
| 10 | 59.4 | 55.6 |
| 14 | 74.1 | 69.2 |
| 20 | 84.0 | 78.5 |
| 28 | 90.5 | 84.0 |
| 35 | 94.5 | 87.2 |
| 48 | 97.5 | 89.9 |
| 65 | 98.6 | 92.3 |
| 100 | 98.9 | 93.8 |
| 150 | 99.1 | 95.1 |
| 200 | 99.3 | 96.2 |

TABLE 7

[Operating Conditions in Calcination Compartment]

Bed Temperature, 1,750° F.
Freeboard Temperature, 1,745° F.
Cyclone Temperature, 1,744° F.
Feed Rate, 98.5 gm./min.
Bed Depth, 24 inches.
Bed Detention Time, 84.4 min.
Exit Gas Analysis:
  $CO_2$, 21.9%.
  $O_2$, 3.8%.

SIZE DISTRIBUTION OF FEED AND PRODUCTS

|  | Percent cumulative plus | |
|---|---|---|
|  | Feed | Composite product |
| Mesh: | | |
| 8 | 34.4 | 26.7 |
| 10 | 62.2 | 53.3 |
| 14 | 77.3 | 68.6 |
| 20 | 87.6 | 78.8 |
| 28 | 93.8 | 85.3 |
| 35 | 97.1 | 87.8 |
| 48 | 98.5 | 88.8 |
| 65 | 99.0 | 90.1 |
| 100 | 99.2 | 91.5 |
| 150 | 99.4 | 93.0 |
| 200 | 99.6 | 94.2 |

Using the 100-mesh particles as the size criteria, the above results indicate that the amount of decrepitation which occurred when the limestone was treated in accordance with the invention is as follows:

|  | Percent |
|---|---|
| In the 1st preheat compartment | 7.6 |
| In the 2nd preheat compartment | 3.4 |
| In the 3rd preheat compartment | 4.5 |
| Total | 15.5 |
| In the calcination compartment | 1.7 |

Thus the total decrepitation or carryover to the cold cyclone was 17.2 percent.

EXAMPLE III - MODIFICATION

In another test, the same conditions as outlined in example II were maintained with the modification that the cold cyclone product was compacted at ambient temperatures in the Komarck Greaves briquetting press.

Under these conditions the briquettes decrepitated when subjected to fluidized bed treatment and the product distribution was substantially the same as the results reported in table 3.

Obviously many modifications and variations of the present invention are possible in the light of the above teachings.

We claim:

1. Process of heat treating finely divided limestone in a fluidized bed reactor to produce a calcined product comprising the steps of;
    initially preheating finely divided limestone to a temperature above 500° F. under fluidizing conditions;
    withdrawing the spent fluidizing gases containing fines resulting from the decrepitation of said limestone during said preheating, recovering said fines from said spent gases under conditions such that the temperature of said fines is maintained at least above 400° F.;
    compacting said recovered fines to produce briquettes of said fines suitable for calcination treatment, said compacting being carried out without the addition of binding agents other than calcined lime formed in the calcination process; and
    combining said briquetted fines with said incoming limestone as a feed material to said initial preheating step.

2. The process according to claim 1 wherein the limestone feed has been ground to a particle size of minus 6 mesh.

3. The process according to claim 1 wherein the velocity of the fluidizing gases during said preheating is sufficient to entrain limestone fines having a particle size smaller than 65 mesh.

4. The process according to claim 1 wherein the briquettes of said fines are granulated and screened on −6-mesh screen.

5. The process according to claim 4 wherein the undersize from said screen is combined with the incoming limestone feed and preheated.

6. The process according to claim 1 wherein the preheated limestone feed is calcined at temperatures in the range of 1700° to 1800° F. and the resulting hot gases are used to initially preheat said limestone fed.

7. The process according to claim 6 wherein the amount of decrepitation resulting from the calcination of said preheated limestone feed is materially less than the amount of decrepitation which occurs when uncompacted limestone is calcined.

8. Process of heat treating finely divided limestone solids in a multistage fluidized bed reactor to produce a calcined product comprising he steps of establishing and maintaining a preheat fluidized bed treatment zone;
    supplying finely divided limestone solids having a particle size minus 6×0 mesh to said preheat zone;
    fluidizing the bed of solids in said preheat zone with hot gases at a temperature sufficient to maintain said bed in a range from about 500—850° F. and at velocity to entrain limestone fines less than 65 mesh;
    separating said −65 mesh fines from said gases under conditions such that the temperature of said fine is above 400° F. compacting said separated fines at said temperature to produce briquettes suitable for calcination treatment;

granulating said briquetted fines to a size in the range of from −6 mesh, recycling the +6-mesh particles for further granulation treatment, combing the −6-mesh fraction with said incoming finely divided feed and conveying the combined mixture to the preheat zone for heat treatment and removal of −65-mesh particles.

9. The process according to claim 8 wherein said fines are compacted at a pressure of 3,000 p.s.i.g.

10. The process of recovering limestone fines resulting from the decrepitation of granular limestone preheated in a fluidized bed to about 500° F. to produce feed material suitable for calcining treatment to convert limestone into lime, which comprises the steps of recovering said limestone fines from the granular material, while maintaining the temperature at above 400° F., but insufficient to substantially alter the chemical composition of said fines;

compacting the thus heated fines substantially without the addition of binding agents other than finely divided lime such as results from a limestone calcining operation; and subjecting said compacted material to heat treatment under fluidized bed conditions at temperatures at which the decrepitation which normally occurs at that temperature is substantially reduced.

11. The process of claim 10 wherein said limestone fines have a particle size less than 65 mesh.

12. The process according to claim 10 wherein said compacting is carried out at about 500° F.

13. The process according to claim 12 wherein said compacting is carried out at a pressure in the order of 3,000 pounds.